United States Patent [19]

Polacsek

[11] 4,326,100

[45] Apr. 20, 1982

[54] COMBINATION AUTOMOBILE SUN VISOR AND SPEAKER ASSEMBLY

[76] Inventor: David D. Polacsek, 780 Oberlin Rd., Apt. 17, Elyria, Ohio 44035

[21] Appl. No.: 143,431

[22] Filed: Apr. 24, 1980

[51] Int. Cl.³ .................. H04R 1/02; B60R 11/02
[52] U.S. Cl. .................. 179/1 VE; 179/146 E; 179/179
[58] Field of Search ............ 179/1 VE, 100 R, 146 R, 179/147, 178, 179, 146 E

[56] References Cited

U.S. PATENT DOCUMENTS

| | | | |
|---|---|---|---|
| 4,056,696 | 11/1977 | Meyerle et al. | 179/100 R |
| 4,169,218 | 9/1979 | Tyler | 179/100 R |
| 4,247,850 | 1/1981 | Marcus | 179/146 R |

FOREIGN PATENT DOCUMENTS

| | | | |
|---|---|---|---|
| 2053038 | 5/1972 | Fed. Rep. of Germany | 179/146 E |
| 671885 | 7/1962 | Italy | 179/1 VE |

Primary Examiner—Vincent P. Canney
Assistant Examiner—Randall P. Myers
Attorney, Agent, or Firm—Pearne, Gordon, Sessions, McCoy & Granger

[57] ABSTRACT

A combination automobile sun visor and speaker assembly for use in automobiles and other motor vehicles, to be mounted above the windshield in place of a conventional sun visor. The speaker assembly comprises a thin, flat, bidirectional speaker enclosed within a layer of acoustically transparent material and means for mounting the speaker above the windshield. The speaker assembly provides speaker placement which is superior to prior art automobile speakers and provides speakers which may be adjusted and which do not waste interior space.

9 Claims, 5 Drawing Figures

COMBINATION AUTOMOBILE SUN VISOR AND SPEAKER ASSEMBLY

BACKGROUND OF THE INVENTION

The invention relates to audio systems for use in motor vehicles, and specifically to speakers used in automobiles.

In obtaining the best audio fidelity possible, speakers play a crucial role, and several factors govern how well a speaker will perform. In automobiles and other motor vehicles, location becomes a particularly significant factor because of the impracticality or impossibility of moving the speakers once they have been installed and because of the limitations imposed by the physical dimensions of the interior of automobiles and other motor vehicles, especially with the growing popularity of smaller automobiles which have less interior room. For example, the conventional dashboard speakers have the disadvantages of being placed relatively low and misdirecting sound into the windshield, with the net result that audio fidelity is impaired. Similarly, conventional speakers installed on the rear compartment below the rear window are too far removed from the occupants of the front seat and misdirect sound into the rear window, which again loses and distorts sound. Door speakers are mounted too low and direct sound to the listener's legs. Door speakers also take up precious interior room or may require cutting into the door. Furthermore, door or dashboard speakers are typically fixed in position so that the sound cannot be redirected to various places in the automobile with the result that an automobile owner installing an audio system with such speakers will be limited to having good audio fidelity in only one area of the automobile.

Some movable speakers for automobiles have been developed. Clip-on speakers for sun visors or windows have been available in the past, but they have disadvantages. Clip-on window speakers typically are attached by a clip to the top of a window, requiring the window to be open, which is undesirable in inclement weather. Clip-on sun visor speakers which clip to the top of a sun visor expose wires and can be hazardous if they fall off, particularly on the driver's side. These speakers also extend outwardly from the sun visor and take up an excessive amount of room. Furthermore, such clip-on sun visor speakers are attached to only one side of the sun visor and, depending on the side to which they are attached, they may get jammed against the roof or against the windshield when the sun visor is moved to its horizontal or vertical position, dispersing all their output onto the roof or windshield, which renders them eventually nonfunctional.

SUMMARY OF THE INVENTION

The present invention solves these and other problems by providing a combination automobile sun visor and speaker assembly comprising one or more thin, flat speakers enclosed within a layer of acoustically transparent material which is mounted above the windshield in place of a conventional sun visor. This assembly performs the dual function of speaker and sun visor and provides an automobile audio system with the features of better audio fidelity and greater compactness.

A speaker mounted above the windshield provides sound propagation radially downward, which provides superior audio reception to that of a speaker mounted below ear level. Furthermore, the invention incorporates the adjustability of a conventional sun visor which has two pivoting movements in order to adjust for shielding of eyes from the sun, one of which allows the sun visor to be tilted between a horizontal position and a vertical position and another of which allows for lateral rotation of the sun visor about its point of mounting. The invention, by enclosing the speaker within the sun visor, incorporates this adjustment feature into the audio fidelity, with the result that sound can be substantially redirected to any place in the automobile by a proper combination of tilting and lateral rotation. This feature is novel and has advantages over prior art speaker systems. To this point, the automobile speaker assembly of this invention offers a substantial degree of capability for redirection of sound that was previously unattainable. The invention has a greater capability for redirection of sound than the speaker which clips on an existing sun visor, since, by enclosing the speaker within the sun visor, the invention makes it possible to use a bidirectional speaker, thus functioning even when jammed against the roof or the windshield.

The invention also furnishes compactness. By locating the speaker within the sun visor, the speaker assembly of the present invention does not take up as much room as the conventional sun visor that it replaces and avoids having the speakers intrude into the space occupied by a driver or passengers. The invention also provides an aesthetic advantage by having the speaker enclosed within the sun visor instead of cluttering up the dashboard. The invention further provides for wiring to be run through the mounting means and down the interior support adjacent to the windshield, which minimizes the degree to which wiring is exposed, as well as minimizing visual clutter. Furthermore, by making the speaker and sun visor a single unit, the speaker assembly may be more easily installed without ripping or cutting out portions of the interior upholstery.

These and other advantages are accomplished by the present invention of a combination automobile sun visor and speaker assembly comprising a thin speaker enclosed in a layer of acoustically transparent material, a hollow mounting means for mounting the speaker above a windshield, and wiring extending from the speaker through the hollow mounting means and capable of extending down along the side of the windshield.

DESCRIPTION OF THE PREFERRED EMBODIMENT

Figure 1:
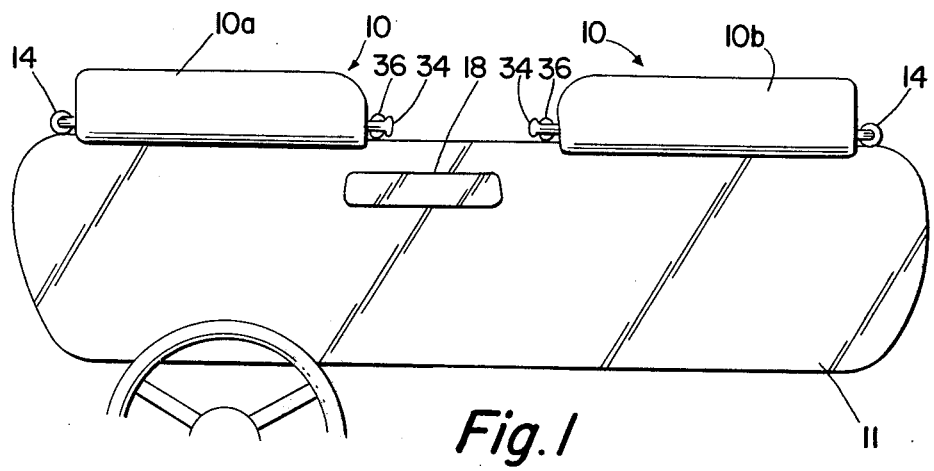
FIG. 1 is a view of an automobile interior looking forward and showing the speaker assemblies mounted in place of conventional sun visors.
Figure 2:
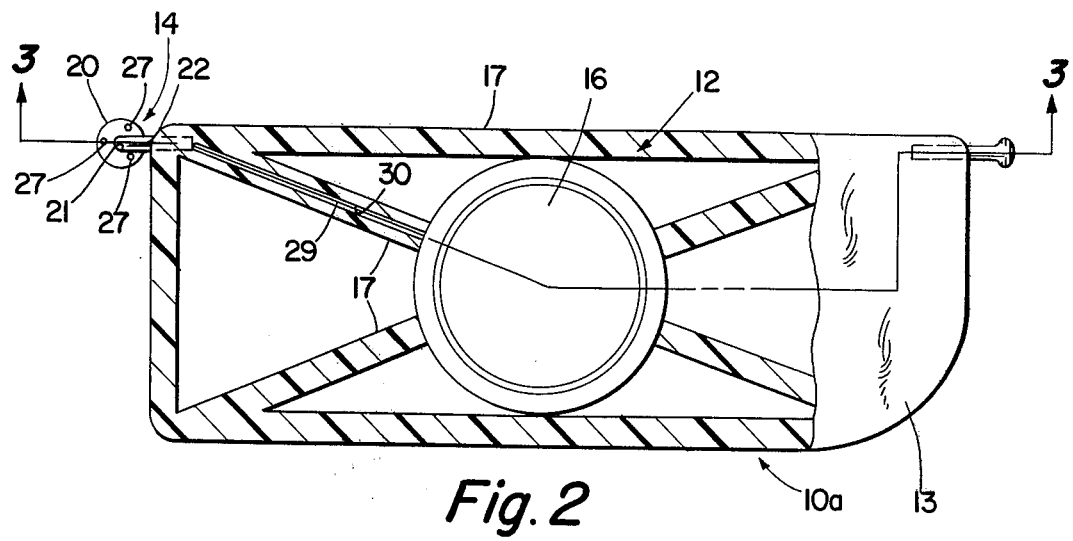
FIG. 2 is a detailed, elevational view of one of the speaker assemblies of FIG. 1, lowered to its downward vertical position, with portions removed.

Referring initially to FIG. 1, the preferred embodiment of the invention comprises a pair of combination automobile sun visors and speaker assemblies 10 located above the windshield 11 of an automobile, in the position of conventional sun visors. One speaker assembly 10a is located above the driver's position, and one speaker assembly 10b is located above the front seat passenger's position. The speaker assemblies 10a and 10b are identical, except that the speaker assembly 10b is the mirror image of the speaker assembly 10a, so that they may be mounted symmetrically. Both speaker assemblies 10 will be described with reference to the speaker assembly 10a. As depicted in FIG. 2, the speaker assembly 10a comprises a thin, flat speaker 12 covered by a layer of acoustically transparent material 13 and a mounting means 14 which provides for mounting the enclosed speaker 12 above the windshield 11 in the manner of a conventional sun visor.

Preferably, the speaker 12 is bidirectional and comprises a lightweight acoustic panel 16 supported by a frame 17 of compatible plastic material. The speaker 12 is constructed of expandable polystyrene and related plastics, providing thinness and lightness as well as a bidirectional polar output. The speaker 12 is available commercially in such forms as the Poly-Planar P-5B wafer-type speaker, available from Poly-Planar Division of Electronic Research Associates, Inc., Moonachie, New Jersey. The speaker 12 is preferably rounded at one corner to conform to the shape of a conventional sun visor and to provide clearance for the rear view mirror 18. The covering material 13 then can be chosen from any form of acoustically transparent material so as to match the automobile interior.

Figure 3:
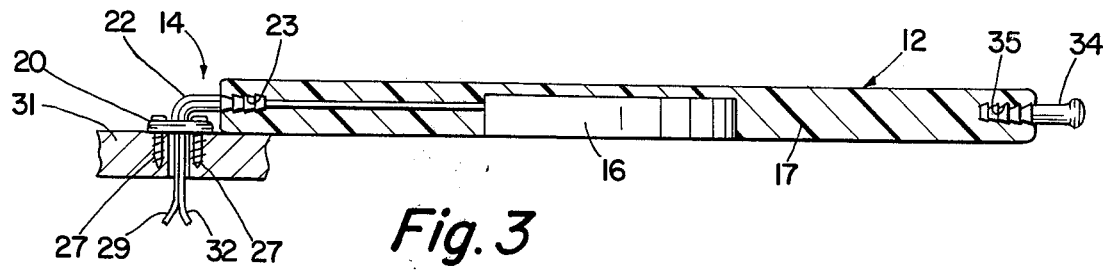
FIG. 3 is a sectional view taken along line 3—3 of FIG. 2.
Figure 4:
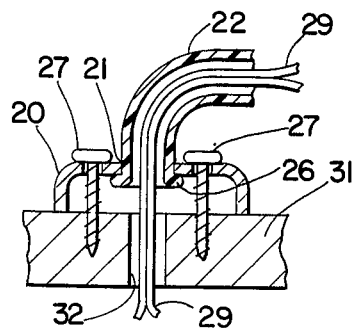
FIG. 4 is a detailed, sectional view of a portion of the mounting means of the speaker assembly of FIG. 2.
Figure 5:
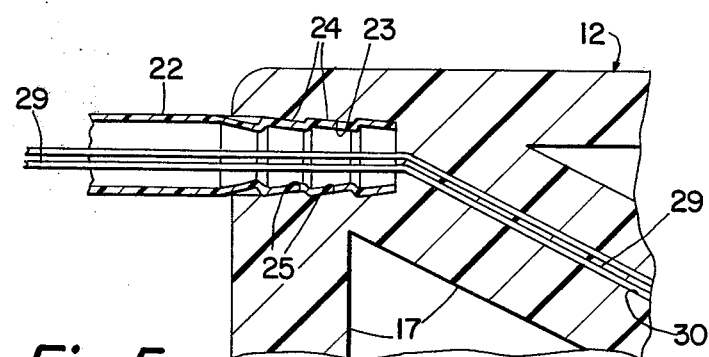
FIG. 5 is a detailed, sectional view of another portion of the mounting means of the speaker assembly of FIG. 2.

The mounting means 14 comprises a small plate 20 having a central opening 21 and a short, hollow, L-shaped, tubular shaft 22. A bore 23 is provided in the speaker 12 extending inwardly at one corner and having an inside dimension approximately the same or slightly smaller than the outside dimension of one end of the shaft 22, which is provided with annular knurls or ridges 24 to make a tight fit in the bore. The series of raised ridges 24 engage a corresponding series of annular indentations 25 along the inside wall of the bore 23 (FIG. 5). The tight engagement of the ridges 24 with the indentations 25 provides a first pivoting connection which permits the speaker to be held in place with minimal movement when the desired position has been achieved, but when a position change is desired, the speaker 12 may then be rotated about the shaft 22 with a sharp manual twist. The other end of the shaft 22 extends into the central opening 21 of the plate 20 (FIG. 4), and has a rim or ridge 26 which is slightly larger than the opening so that the end of the shaft is retained by the plate 20. This end of the shaft 22 is capable of rotation within the plate 20, permitting the speaker 12 to be moved pivotally about the mounting and providing a second pivoting connection. The plate 20 is also provided with holes for screws 27, as depicted in FIGS. 2, 3, and 4, so that the assembled mounting means may be mounted in the automobile interior above the windshield in the position provided for a conventional sun visor (FIG. 1).

The speaker assembly 10 is capable of the full range of adjustments associated with a conventional sun visor. The attachment of the shaft 22 to the plate 20 allows the speaker 12 to be moved horizontally, pivoting about its attachment point, between a position over the windshield 11 and a position above the side window, or any position in between. The tight rotatable connection between the ridges 24 and the indentations 25 allows the speaker 12 to be rotated on the shaft 22 and moved between a horizontal position against the interior roof and a vertical position extending downwardly.

To connect the speaker 12 to the rest of the automobile audio system, located typically in the dashboard, speaker wiring 29 extends from the acoustic panel 16 through a groove 30 to the bore 23. The speaker 12 must be modified to incorporate a groove 30 in one of the diagonal supports of the frame 17 so as to permit the wiring 29 to be connected from the bore 23 to the central acoustic panel 16. The wiring 29 extends through the hollow shaft 22 to the wall 31 of the automobile interior. A hole 32 is provided through the interior wall 31 coaxial with the central opening 21 in the plate 20. The wiring 29 may then be extended through the hole 32 and down inside the wall along the support beside the windshield 11 to the dashboard.

An additional catch 34 may also be provided extending from the corner of the speaker 12 on the opposite side from the shaft 22. The catch 34 is mounted in the speaker 12 in the same manner as the shaft 22 by providing a bore 35 in the speaker having annular indentations which engage corresponding ridges on one end of the catch 34. The catch 34 permits the free end of the speaker assembly 10 to be secured above the windshield 11 to a latch 36 from which it may be readily detached manually. The catch 34 may also be secured to the speaker frame 17 by glue or some other adhesive.

In addition to providing a unique speaker capable of a range of adjustable positions previously not possible with conventional speaker assemblies, the present invention does not sacrifice the benefits and advantages of conventional sun visors. It is clear that the speaker assembly 10 may also be used as a sun visor and that the sun visor function is provided when it is not being used as a speaker and when it is used as a speaker. As a sun visor, the combination sun visor and speaker assembly 10 may be adjusted as required to shield the eyes of the driver and/or the passenger from sunshine or glare. Due to the preferred bidirectional properties of the speaker 12, the speaker assembly 10 may also be fully functional as a speaker regardless of its orientation as a sun visor.

In place of the single bidirectional speaker 12, a plurality of small, thin speakers may be mounted in a frame corresponding the frame 17. The plurality of speakers would avoid the use of the specialized speaker 12, but would likely not produce the same quality of sound.

While a preferred form of this invention has been specifically illustrated and described herein, it will be apparent to those skilled in the art that modifications and improvements may be made to the forms herein specifically disclosed. Accordingly, the present invention is not to be limited to the forms herein specifically disclosed or in any other way inconsistent with the progress in the art promoted by this invention.

What is claimed is:

1. A combination automobile sun visor and speaker assembly comprising a thin bidirectional wafer-type speaker enclosed in a layer of acoustically transparent material to form an entire sun visor, the speaker comprising a lightweight acoustic panel supported by a frame, means for mounting the speaker above a windshield in place of a conventional sun visor, the mounting means comprising a pivotable sun visor mounting assembly attached directly to the speaker, and wiring extending from the speaker for connection to an external audio source.

2. A combination automobile sun visor and speaker assembly as defined in claim 1, which provides shielding of the eyes from the sun to the degree provided by an automobile sun visor.

3. A combination automobile sun visor and speaker assembly as defined in claim 1, wherein the mounting means is hollow and the wiring extending from the speaker assembly extends through the hollow mounting means.

4. A combination automobile sun visor and speaker assembly as defined in claim 3, wherein the mounting means comprises a bore in the speaker, a hollow tubular shaft one end of which engages the bore, and a plate having an opening holding the other end of the shaft, the wiring extending through the bore in the speaker, through the hollow shaft, and through the opening in the plate, and being capable of extending down along the side of the windshield.

5. A combination automobile sun visor and speaker assembly as defined in claim 1, comprising in addition a catch attached on one side of the speaker opposite the mounting means and capable of engaging a latch on the automobile interior to secure the speaker assembly.

6. A combination sun visor and speaker assembly as defined in claim 1, wherein the mounting means has a first pivoting connection allowing the speaker to be tilted freely between a horizontal position and a vertical position to permit both shielding of the eyes from the sun and substantial redirection of sound.

7. A combination automobile sun visor and speaker assembly as defined in claim 6, wherein the mounting means has a first pivoting connection comprising a hollow shaft having a series of raised ridges, the speaker having a bore for the shaft, the inside walls of the bore having indentations for the ridges, the ridges engaging the indentations to hold the speaker in place with minimal movement.

8. A combination automobile sun visor and speaker assembly as defined in claim 6, wherein the mounting means has a second pivoting connection allowing the speaker to be freely laterally rotated to permit both shielding of the eyes from the sun and substantial redirection of sound.

9. A combination automobile sun visor and speaker assembly as defined in claim 8, wherein the second pivoting connection comprises a hollow shaft having a rim at one end, a plate adapted to be mounted to the automobile interior, and a central opening for the shaft, the plate around the central opening engaging the rim on the shaft to hold the speaker in place with minimal movement.

* * * * *